United States Patent [19]
Rainey

[11] Patent Number: 4,782,618
[45] Date of Patent: Nov. 8, 1988

[54] WEEDLESS FISHING LURE

[76] Inventor: Jack D. Rainey, R.R. 2, Box 797A, Granite City, Ill. 62040

[21] Appl. No.: 71,904

[22] Filed: Jul. 10, 1987

[51] Int. Cl.$^4$ .............................................. A01K 85/02
[52] U.S. Cl. ........................................ 43/35; 43/37; 43/42.41; 43/43.4
[58] Field of Search ................. 43/35, 37, 42.41, 43.4

[56] References Cited

U.S. PATENT DOCUMENTS

| | | | |
|---|---|---|---|
| 519,684 | 5/1894 | Goff et al. | 43/35 |
| 1,021,699 | 3/1912 | Nordlund | 43/35 |
| 1,670,174 | 5/1928 | Wiersma | 43/35 |
| 1,890,266 | 12/1932 | Schadell et al. | 43/35 |
| 1,994,878 | 3/1935 | Smith et al. | 43/37 X |
| 2,256,088 | 9/1941 | Hogan | 43/37 X |
| 2,590,752 | 3/1952 | Chaffee | 43/37 |
| 3,266,185 | 8/1966 | Abramson, Jr. | 43/37 X |
| 3,411,233 | 11/1968 | Hopper | 43/35 |

*Primary Examiner*—Nicholas P. Godici
*Assistant Examiner*—Carmine Cuda
*Attorney, Agent, or Firm*—Paul M. Denk

[57] ABSTRACT

A weedless fishing lure having at least one hook with an integral cam and a spring within a lure body movable between a retracted and an extended position. The lure body generally is formed of a pair of upper and lower halves, having a separation plate located therein, and which positions the cam of this invention into its operative condition, wherein the securement of a spring therewith normally sustains the cam and its hooks rearwardly and concealed within the lure body, while a linkage connecting with the same cam, and when subjected to tensioning pressure, exceeding that of the spring, forces the cam means forwardly, for pivoting of its hooks upwardly, and their exposure externally of the lower body for impaling of any fish biting thereon.

7 Claims, 2 Drawing Sheets

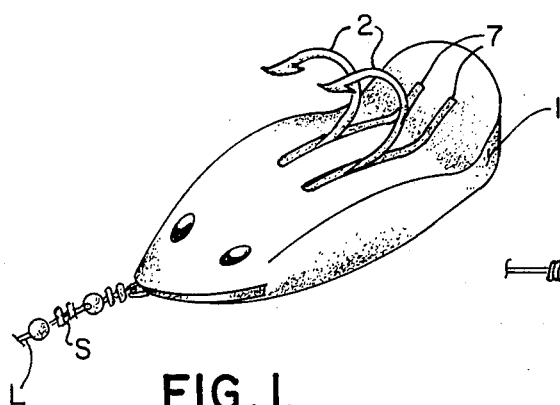
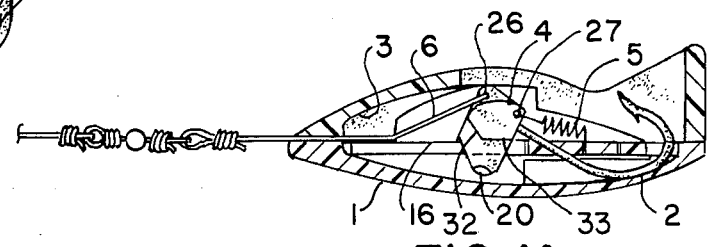
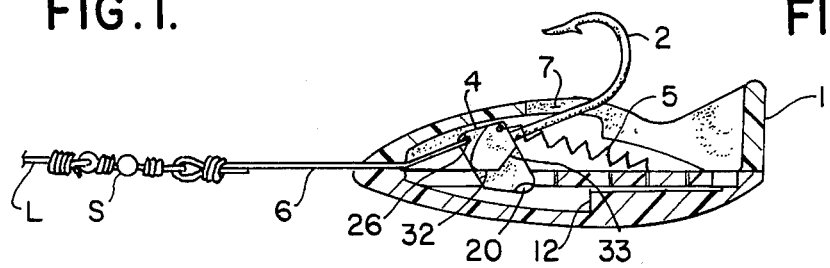
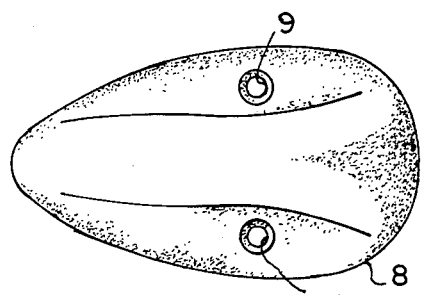
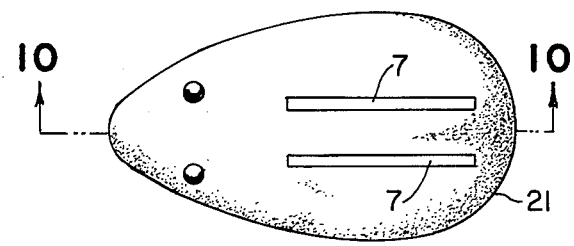
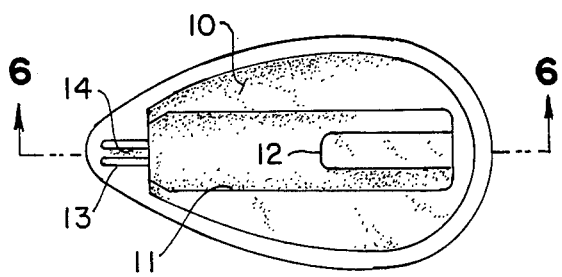
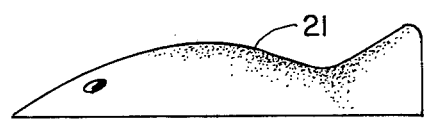
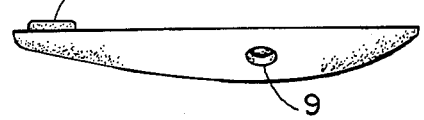
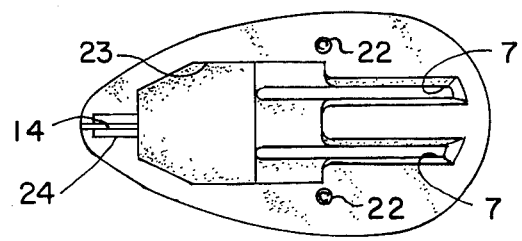
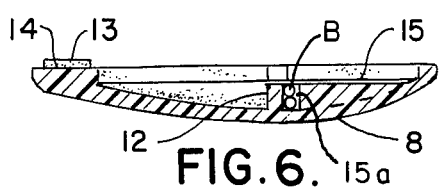
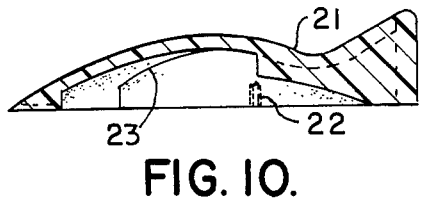

WEEDLESS FISHING LURE

BACKGROUND OF THE INVENTION

This invention relates generally to a fishing lure, and more specifically one wherein its hook means are normally enclosed within the body portion of the lure, thereby rendering it substantially weedless and non-snagging, during its usage, but upon the biting of a fish, has its hook means pivoted exteriorly of the body means for impaling of a fish during its application.

There are a significant number of prior art patents that disclose various type of fishing plugs, incorporating even depressable hooks, as within the body portion of the plug, so that when pressure is exerted upon the hook it either exposes it, or releases it to spring action that thrusts the hook, or part thereof, externally of the plug body, as for snagging or catching of a fish. For example, the patent to Belding, U.S. Pat. No. 1,204,538, is upon an artificial bait, and which incorporates a shaft contained within the artificial bait body, and having various connecting strips securing with the shaft, and which secure with the hooks, such that when the shaft apparently is sprung forwardly, it causes a pivoting of the hooks from a position maintained interiorly of the lure body, to an exposed position exteriorly of the same.

The United States patent to Fenner, U.S. Pat. No. 1,571,770, discloses another form of artificial bait device, and which in this particular instance incorporates a pair of body portions for the shown lure, and a complex mechanism therein, such that when the body housing is collapsed as a result of a fish taking hold of the bait, a lever is rocked upon its pivot for releasing of a pin and for causing a projecting of the lure hooks beyond the outer surface of its housing body. Another patent to Fenner, U.S. Pat. No. 1,615,747, discloses a similar type of rather complex linkage system within the bait housing body for providing for the projecting of its hooks externally, generally under spring pressure, such as through the variety of springs as shown therein, to dispose the hooks exteriorly of the lure body as when a fish takes a nibble or bite.

The United States patent to Fisher, U.S. Pat. No. 1,639,766, discloses another form of fish lure, whereby the hooks may be set in their operative position, as shown, but that when shank is released, and projects forwardly, the hooks are allowed to project exteriorly of the lure body. In addition, a spring mechanism may provide for the automatic resetting of the hooks within the lure body, in the event that a catch is missed, or should a fish get free of the lure.

The United States patent to Fogelson, U.S. Pat. No. 1,959,911, discloses another form of retractable hooks, for use in conjunction with a fish lure. In this particular instance, when the cams of the lure are depressed, as a result of a fish bite, the hooks are released for projecting externally of the lure body.

The United States patent to Shetka, U.S. Pat. No. 2,436,232, shows another variation upon a fish lure. In this particular instance, when the fish bites, and places stress on the leader for the lure, this causes the actuation of a lever, forcing the hooks to be released and for projecting externally of the lure body. The device may also be reset for further usage through resetting of its lever means.

The patent to Widmer, U.S. Pat. No. 2,521,555, discloses another form of fish bait. In this particular instance, when a fish bites upon the lure, it compresses the figure plate, causing the pin to push against its bolt, releasing it, whereby the spring-biased piston and its rod project rearwardly for pushing the hooks externally of the lure body. This device may also be reset.

The United States patent to Borgen, U.S. Pat. No. 2,675,639, discloses another form of weedless casting spoon, and in this particular instance, the pair of plates when normally biased apart have their hooks arranged therebetween, and in a weedless disposition. But, when a fish bites, causing the two plates to compress together, the hooks eject exteriorly of their opposed plates, for hooking of a fish. There is a simple spring means that normally keeps the two plates separate, until the fish bites.

The United States patent to Anderson, U.S. Pat. No. 3,018,582, discloses another form of a fishing lure. As can be seen, this device incorporates an arm extending exteriorly of the lure body, but which when depressed, releases the plate for projecting rearwardly an extension of the hooks to an external position of the body. This device may also be reset.

The patent to Hameen-Anttila, U.S. Pat. No. 3,816,953, discloses another form of fish lure, wherein a pair of hooks are arranged generally within the tail portion of the disclosed lure body, but that when the trigger is depressed, as through a fish bit, this releases the latch mechanism, thereby allowing the spring to push the said latch rearwardly, and guiding the hooks into their external disposition, for snagging of the fish.

The United States patent to Levstik, U.S. Pat. No. 4,176,489, shows a fishing lure with retractable and automatically extendable hook. This particular device maintains the hook within the lure body, but that when the trigger is depressed, releases the holding bar, and the spring pressure then biases the bar rearwardly for the pivoting of the hook, and for its projection externally of the lure body.

The foregoing provides an analysis of the various prior art type of devices that exist in this field pertaining to fishing lures, and more specifically those wherein hooks are generally concealed, until such time as the hooks are released for snagging of a biting fish. On the other hand, the principal object of the current invention does not include spring means or triggering means wherein the hooks are sprung into a position of application, as for snaring of a fish, but to the contrary, incorporates spring means that normally biases the hook within and retains the same interiorly of the lure body, until such time as the fish itself pulls upon the lure body, thereby forcing the hooks externally of the same, generally through the application of a cam action. In addition, because the hooks are normally biased internally of the lure, and concealed, once the fish releases, or the snag pressure is discharged, the hooks will shift to and remain interiorly of the lure body, by spring action, and not remain externally of the same, as shown in most of the prior art as disclosed herein. Thus, no resetting action is necessary during application of the lure of this design.

It is the principal object of this invention to provide a lure design which provides for the interaction between a spring means that normally conceals the hook(s), of the lure within its body, but that the pressure exerted through the bite of the fish causes the hooks to become exposed, for impaling of the biting fish. On the other hand, should the fish release the same, the spring biasing means of the lure, and which is embodied internally thereof, draws the hooks once again inside of the lure, to sustain the weedless attributes of the lure for continuing usage, thereby obviating any resetting as normally may be required from prior art related devices.

Another object of this invention is to provide a fish lure that may be quickly secured to the fish line, with the link means or leader leading from the lure comprising the line of force aligned directly towards the hook means, and its cam mechanism, that normally pulls the hooks for exposure externally of the lure caused during the bite of a fish.

Another object of this invention is to provide a fish lure which may be molded in parts, have its operating mechanism including the hook means enclosed therein, with the halves being sealed or generally affixed together, during lure assembly.

Another object of this invention is to provide a fish lure wherein its operating mechanisms may be encapsulated within a shell structure, and then located within the mold of an injection molding unit wherein polymer may be molded in place for the unitary formation of a lure body about its shielded operative components.

Another object of this invention is to incorporate operating mechanism, in the form of cam means, within the lure body, such that when a forward pull of the cam means is exerted, causes its hooks to naturally glide externally of the lure body, for snagging of a biting fish.

Still another object of this invention is to provide a cam operating means within a fishing lure body wherein once the fish is released, or should a biting fish not be caught, the cam means will be drawn rearwardly, by spring biasing means, for retracting the hooks back within the interior of the lure body.

These and other object may become more apparent to those skilled in the art upon reviewing the summary of this invention, and upon undertaking a study of the description of its preferred embodiment, in view of the drawings.

SUMMARY OF THE INVENTION

This invention contemplates the formation of a fishing lure, and more specifically one that is significantly weedless in its operations, mainly because the means for impalement of the fish when it is caught normally remain concealed, and not of utility, until such time as the fish actually bites the lure, exerts pressure upon the lower body, and then its hook(s) extend externally of the same, for achieving a hooking of the striking fish. This invention is a weedless style of fishing lure, which, in its principal embodiment, may undertake the appearance of a form of ladybug, beetle, or other insect shape, although the particular shape for the designed lure is not essential to its construction, operation, and functional aspects. The lure incorporates a body means of sufficient length, height, and width, so as to form a hollow interior, as to be subsequently described, and which incorporates one, or a pair, or more, of slots, formed through its upper surface, and through which the hooks may be exposed when pressure is applied to the lure body. A lining means, or a form of linkage, extends out of an aperture provided proximate the frontal surface of the lure body, and which link has an eyelet therein, and to which the fishing line may be tied. In addition, and although it is not essential, the lure body may incorporate a hook means, at its terminal end, and to which a further appetizing bait, in the nature of a pork rind, or frog chunk, may be appended, to further incite the fish, and particularly bass, or the like, to entertain a strike or bite.

Fishing hooks, or at least one, are designed for being embodied, operatively, within the lure body, but are also provided for capabilities for extending upwardly through one or more slots, depending upon the number of hooks involved, furnished within and through the lure body surface. When the lure is bitten, or at that time when resistance is placed onto the lure body, against its movement through the pull of the fishing line, this has a tendency to form tensioning upon the fishing line, the linkage means that interconnects between the fishing line and the internally arranged hooks, and through the operations of a cam means, then extends the hook(s) externally of the lure body, wherein that means, namely fish, applying pressure causing resistance to the normal movement of the lure may be impaled upon the exposed hooks. Obviously, in most instances, that force exerting means will comprise the mouth of the fish that has enveloped or attracted by sinking the lure means into its mouth.

The lure body, as previously explained, does incorporate a hollow interior, having the fish hooks operatively associated therein, ith the bottom of the lure means, internally, including a guide slot in which a cam means is designed to longitudinally shift under pressure, and be pivoted in its arrangement, as about its pivot means. This pivot pin, which is in the nature of a rocker arm, provides the support for holding of the hook supported cam means in position, with the cam means normally being drawn rearwardly within the lower body, by means of a spring means. But, when pressure is exerted upon the linkage, which also connects with the cam means upwardly of its pivot point, this has a tendency to shift the cam means forwardly, while at the same time achieving its pivotal movement, for exerting or shifting the hooks about an upwardly directed arc, to expose the upper ends of said hooks externally of the lure body, and hopefully impale them into the fish's mouth, to achieve a hooking of the same. It is well known that when fish are biting they have a tendency to suck and retain the fishing lures deeply within their mouth, or throat, and at that time significant force is applied to the lure to be retained therein, as by the biting fish, and this significantly increases the tension upon the fishing line, of the fisherman, which causes the cam means to slide within its guideway, during lure operation. On the other hand, should a fish slide off of the lure, or not be hooked by the fisherman, the lure will immediately move forwardly, under the tension exerted upon its line, until such time as the tension upon the fishing line decreases, thereby allowing the linkage, and the cam means with its supportive hooks, to be biased under the tendency of its spring means to be pivoted and rocked back rearwardly into a position where the hooks are withdrawn back into the lure body, once again imbuing the lure with weedless characteristics.

Another attribute of this invention is that the operative components of this lure, such as its cam means, the supported hooks, the spring means, all may be encapsulated within a shell, and then have the lure body molded as a unitary component through injection molding about the shell, when forming the completed lure as through a polymer injection molding process.

BRIEF DESCRIPTION OF THE DRAWINGS

In referring the drawings,

FIG. 1 is an isometric view of the weedless fishing lure of this invention;

FIG. 1A is a longitudinal sectional view taken of the lure shown in FIG. 1;

FIG. 2 is likewise a longitudinal sectional view, with tension being applied to the fish line, causing the lure hooks to be pivoted into their and operative and fish impaling position;

FIG. 3, is a bottom view of the fishing lure body means;

FIG. 4 is an upper plan view of the lower fishing lure body component;

FIG. 5 is a left side view of the component shown in FIG. 4;

FIG. 6 is a longitudinal sectional view of the lure body lower half as shown in FIG. 4;

FIG. 7 is a plan view of the lure body upper half;

FIG. 8 is a left side view thereof;

FIG. 9 is a plan view looking upwardly of the upper fishing lure body half;

FIG. 10 is a longitudinal sectional view taken along the line 10—10 of FIG. 7;

DESCRIPTION OF THE PREFERRED EMBODIMENT

Figure 17:
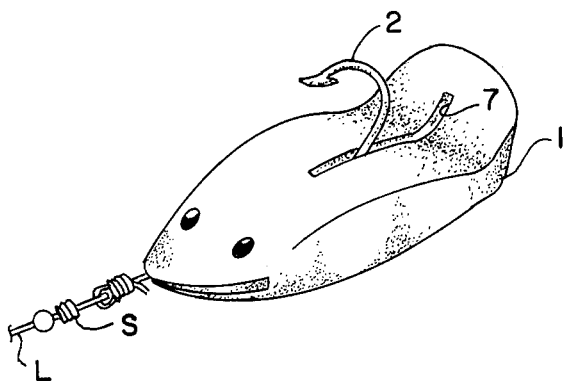
FIG. 17 is a modification in the weedless lure design but showing a singular hook means extended for hooking of a fish.

The subject matter of this invention comprises, as previously explained, a generally weedless form of fishing lure, one that will not get snagged within the weeds during application and usage, preferably will not snag upon other brush, limbs, or the like, but when encountering the nibbling of a fish, will readily hook the same to enhance the piscatorial pleasures of the fisherman. As can be seen in FIG. 1, the lure includes a shaped body means 1, and which, as previously summarized, may undertake any of a variety or infinite number of shapes which have been found to be enticing, or hopefully attractive, to the fish. As can be noted, this particular embodiment is connected by means of a swivel connector S, or the like, to the fishing line L. This particular lure is shaped in the form of, for example, a beetle, and incorporates a pair of hooks, as at 2, which extend and project upwardly from the body means of the lure, when tension has been encountered by the lure, as for example upon the bite of a fish. Although two hooks are shown in this particular embodiment, as can be also seen in FIG. 17, a singular hook, as at 2, may be embodied in the lure design.

As can be seen in FIG. 1A, the lure body 1 incorporates a cavity, as at 3, within its interior. The operating mechanism of this invention is located within said cavity, and includes a cam means 4 having the fish hook 2, rigidly mounted therewith, and subject to the operative movements of the cam means during lure application. A spring means 5 normally biases the cam means rearwardly, for keeping its hook(s) 2 generally retracted within the lure body, as during normal usage, and before any fish bite occurs. A plate means 16 positions the cam means 4 into its operative location, and for maintaining it either at its rearward inoperative positioning, as shown in FIG. 1A, or pulled forwardly for exposure of the hooks, as shown in FIG. 2. The positioning of the hook(s) 2 as shown in FIG. 2, normally occurs when a fish bites upon the lure, creating significant tension upon the line L, any swivel S connecting therewith, and the linkage 6 which, as can be seen, connects with the cam means 4, where noted. When a fish does bite, and the cam means 4 is pulled forwardly, under the subject tensioning forces, the spring means 5 is stretched, as noted, against the force applied by the fish, to cause the hook(s) means 2, through the pivotal and forward shifting of its cam means 4, to be disposed upwardly through the variety of slots, as at 7, to provide the barbed portion of the hook for disposition and exposure for impaling in the fish's mouth, throat, or whatever portion of the fish is in contiguous therewith.

The lure body 1 is actually formed, in this particular embodiment, in two halves. One is the lower half 8, as shown in FIG. 3, and which includes a pair of apertures, as 9, therethrough, and through which fasteners, such as screws, may mount, for securing the upper and lower halves of the fish lure body means together. As can be seen, as in FIG. 4, the interior of the bottom half of the lure body means is shaped being substantially hollowed, as at 10, and further includes a grooved portion, as at 11, within its bottom, longitudinally arranged. It is within this portion of the lure body that part of the operative component of the cam means 4 slides, as shown in FIGS 1A and 2, and which will be substantially subsequently described. A stop means, formed by the shoulder 12, provides the rearwardmost structure against which the cam means 4 encounters, at that time when its hook means 2 will be fully withdrawn and retracted within the lure interior cavity, as shown in FIG. 1A. In addition, forwardly of the interior 10 of the lure body lower segment, there is provided a positioning means 13, which has a tendency to assure the inner engagement of the upper and lower halves of the lure body together, but likewise, forms a channel, as at 14, and through which the linkage 6 locates, for extending exteriorly of the formed lure body means, to provide for freedom of its shifting therein, as when the cam means 4 extends between its rearwardmost position, as shown in FIG. 1A, or shifted and pivoted forwardly, as shown in FIG. 2.

Figure 11:
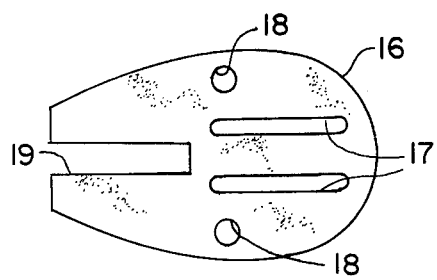
FIG. 11 is plan view of the plate that retains the cam means within the fish lure lower body half.
Figure 12:
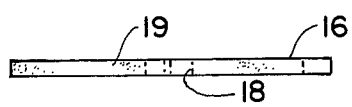
FIG. 12 is a left side view of the plate shown in FIG. 11.
Figure 16:
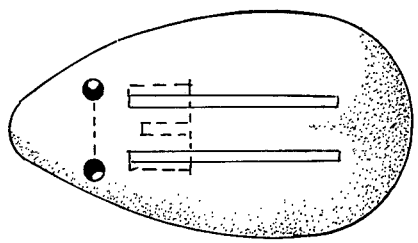
FIG. 16 is a top view of the lure showing the hook means in their inoperative position retracted within the lure body.

As can also be seen in FIG. 6, the lower bottom segment 8 of the lure body means incorporates a shelf, as at 15, and onto which a plate means 16 locates. Such plate means is shown in FIG. 11. This plate means is designed having also a pair of slots, as at 17, provided therethrough, and into which the back portion of the shanks of the hook means 2 can insert, as when the hooks are retracted into their lure body emplacement positions, as shown in FIG. 1A. Also, a pair of aligned apertures 18 are also provided, being in alignment with the apertures 9, and through which any fastening means may locate when securing the lure body components, or halves, together. The frontal part of the plate means 16 includes a formed slot, as at 19, and a portion of the cam means rides within said slot, during its shifting forwardly and rearwardly within the lure means, in the manner as previously described. Below the plate means 16 that part of the cam means, or its lateral projections, as at 20, permanently locate, and have the tendency to confine the cam means into position, such that, when the cam means is retracted rearwardly, as shown in 1A, the spring means biases the hook means interiorly of the lure body, to locate the said hooks in an inoperative position, but that upon tension exerted on the fishing line, as when a fish bites at the lure, and the cam means moves forwardly, these cam means projections 20 ride within this bottom interior slot formed within the lower lure means body 8, such as shown in FIG. 2, to assure that the proper pivotal movement is experienced by the cam means, and its hooks 2, during functioning of the weedless fishing lure.

It is to be noted that there is a cavity, as at 15a, provided within the shelf 15, and within this cavity a weight means, such as a BB or two as at B may be located in order to add balance to the lure, to help maintain it upright, and to also give a rattling noise or effect to the lure during its application particularly to attract fish to it as a top water lure.

As can also be see in FIGS. 7 through 10, the lure body means includes an upper half, as at 21, and this encloses the lure body structure, generally through the tightening of the fastening means within the threaded apertures, as shown at 22. The upper interior of the lure body 21 also includes an arranged cavity, as at 23, and in which the upper segment of the cam means 4 may locate, during its operative movements during functioning of the device. As can be seen, the interior cavity 23 includes the slots 7, which affords clearance for passage of the hook means 2 between the inoperative and the fish impaling positions. Furthermore, the frontal portion of the means 21 includes a clearance slot, as at 24, for accommodating the insertion of the positioning means 13, and likewise provides a channel, as at 14, for freedom of passage of the linkage 6 therethrough.

Figure 13:
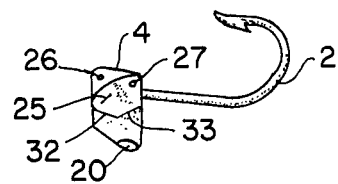
FIG. 13 is a view of the cam means and hook means of this invention.
Figure 14:
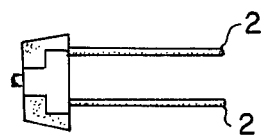
FIG. 14 is a bottom view thereof.
Figure 15:
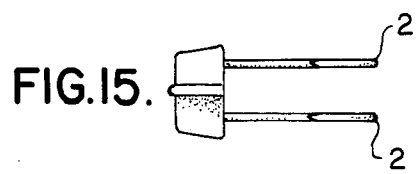
FIG. 15 is a top view thereof.

The cam means 4 of this invention is more acurately shown in FIGS. 13 through 15. It includes the cam means body 4, as noted, and which has the hook means, as at 2, firmly affixed thereto. See also FIG. 17. The lateral projections 20 extend from the bottom of the cam means 4, while the upper portion of the cam means includes further extensions, as at 25, and which are designed for riding upon the surface of the plate means 16, as the cam means 4 and the hooks 2 are slid forwardly, and upwardly, for pivoting into their operative positions. Also these extensions 25 provide mounts for holding these hooks, as can be seen. A small aperture, as at 26, is provided at the upper segment of the cam means 4, and the linkage 6 connects therewith, as can also be seen in FIG. 2. In addition, another aperture 27 is provided in the upper segment of the cam means, and has the spring means 5 secured, at one end, thereto. The opposite end of the spring means secures to the separation plate 16.

It should be noted that the bottom of the extension 25 is relatively vee shaped, as can be seen in FIG. 13, forming the surfaces 32 and 33. During functioning of the lure, when in its inoperative state, the surface 33 rests upon the surface of the plate 16 at a rearwardly position. When and as the hook(s) 2 are being exposed, the surface 32 rides like a cam in forward movement also upon the surface of the plate 16.

Figure 18:
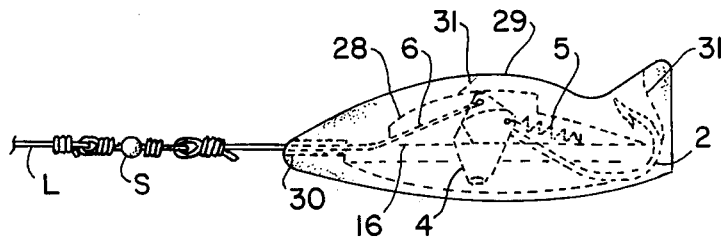
FIG. 18 discloses the operative components within the lure body encapsulated within a shell and the polymer injected molded body in place surrounding the same.

A final aspect of this invention includes the integral molding of the lure means as a unitary structure. This can be seen in FIG. 18. The operative components of the lure means, including the cam means 4, the hook means 2, the spring means 5, the linkage 6, and the plate means 16, are all generally embodied within a surrounding shell, as at 28. These components are then located within the mold for a polymer injection molding machine, and the lure body means, including both its upper and lower halves, are molded and formed as an integral unit, as can be seen at 29. Various clearance means may extend from the shell 28, such as a sleeve 30, from its frontal portion, in addition to slot forming means, as at 31, to assure the proper formation and location of the clearance slots, such as the slot 7, to provide clearance for movement of the hook(s) from their inoperative positions, as shown in FIG. 18, towards the position of usage, as shown in FIGS. 2 amd 17, when readied for impaling of fish. This is just one means by which the lure of this invention can be integrally molded as a unitary item, having its various operative components previously assembled, and located into a position where a unitized lure body can be molded therearound.

Variations or modifications to the subject matter of this invention may occur to those skilled in the art upon reviewing the subject matter of this disclosure. Such variations or modifications, if within the spirit of this invention, are intended to be encompassed within the scope of any claims to patent protection hereon. The subject matter of this disclosure, as described in the preferred embodiment, is primarily set forth for illustrative purposes only.

Having thus described the invention what is claimed and desired to be secured by Letters Patent is:

1. A fishing lure for affixing to a line and for use in piscatorial pursuit of a fish, including, a body means, hook means, including a hook portion normally concealed within said lure body means, spring means urging said hook means within said body means, a cam means secured to said hook means, said fishing line capable of securing to said cam means during lure application, cam surfaces provided within said body means, and upon which the cam means moves as it shifts forwardly or rearwardly of the body means during lure application, said body means having a slot therein, said hook means disposed for partially extending exteriorily of the body means, through its slot, for exposure of the hook portion as during the bite of a fish, said body means formed of two halves, and said halves being secured together with the hook and cam means therein during assembly of the fishing lure, fastener means securing said body halves together during lure assembly, a plate means supported internally of the two body means halves, said plate means functioning as a first cam surface cooperating with the cam means to shift the hook between the operative and inoperative positions, said plate means having a formed slot therethrough, said cam means extending through said formed slot, part of said cam means disposed above the said plate means and having another cam surface provided thereon for riding upon the cam first surface of the plate means as the cam means shifts the hook between its operative and inoperative positions, projections extending from that portion of the cam means disposed beneath the plate means to retain the cam means with respect to the plate means within the lure body means.

2. The invention of claim 1 and wherein said lure being a top water lure, and having means provided within it to generate a noise as a fish attractant.

3. The invention of claim 1 and wherein said lure having weight means provided within it to provide balance.

4. The invention of claim 1 and wherein there are a pair of slots provided through the body means, a pair of hook means securing with the cam means, and said pair of hook means disposed for extending through the pair of slot means during application of the fishing lure.

5. The invention of claim 1 and including link means connecting with the cam means interiorly of the body means, said link means extending forwardly and exteriorly of the body means, and having an eyelet formed thereat for affixing of the fishing line thereto during application of the lure.

6. The invention of claim 1 and wherein said body means of the fishing lure being formed of a molded polymer.

7. The invention of claim 6 and wherein said cam means and hook means being encapsulated within a shell, and said shell disposed for being molded within the body means during its formation.

* * * * *